United States Patent [19]
Brown et al.

[11] Patent Number: 5,939,514
[45] Date of Patent: Aug. 17, 1999

[54] COATING COMPOSITION HAVING EXTENDED STORAGE STABILITY AND METHOD FOR PRODUCING WEAR RESISTANT COATINGS THEREFROM

[75] Inventors: Ward Thomas Brown, North Wales; Donald Craig Schall, Lansdale; Francis Joseph Landy, Jenkintown; Ann Robertson Hermes, Ambler, all of Pa.

[73] Assignee: Rohm and Haas Company, Phila., Pa.

[21] Appl. No.: 08/906,538

[22] Filed: Aug. 5, 1997

Related U.S. Application Data

[60] Provisional application No. 60/027,377, Sep. 26, 1996.

[51] Int. Cl.$^6$ .......................... C08L 79/00; C08L 101/00; C09D 5/02; C08K 5/00
[52] U.S. Cl. .......................... 528/229; 526/308; 526/310; 526/312; 524/96; 524/247; 524/249; 524/314; 524/521; 427/379
[58] Field of Search ..................................... 524/521, 314, 524/96, 247, 249; 526/312, 308, 310; 528/229; 427/379

[56] References Cited

U.S. PATENT DOCUMENTS

| 4,812,493 | 3/1989 | Cummings | 523/412 |
| 5,340,870 | 8/1994 | Clinnin et al. | 524/522 |
| 5,527,853 | 6/1996 | Landy et al. | 524/521 |

FOREIGN PATENT DOCUMENTS

| 0594321 | 4/1994 | European Pat. Off. . |
| 0721003 | 7/1996 | European Pat. Off. . |
| 0728822 | 8/1996 | European Pat. Off. . |
| 0778317 | 6/1997 | European Pat. Off. . |
| 4415354 A1 | 5/1994 | Germany . |
| 195 29 659 | 3/1996 | Germany . |
| 06-271789 | 9/1994 | Japan . |
| WO 94/09068 | 4/1994 | WIPO . |
| WO 95/31511 | 11/1995 | WIPO . |
| WO 96/18698 | 6/1996 | WIPO . |
| WO 96/22338 | 7/1996 | WIPO . |
| WO 97/20004 | 6/1997 | WIPO . |

OTHER PUBLICATIONS

"Traffic Paint Cost & Formula Characteristics, White Cloud Safe Yellow R–PY65M and White Cloud 30", Sino–American Pigment Systems, Inc., Emeryville, CA. The publication date is not available.

Chen, M.J., et al., "Epoxy Silanes in Reactive Polymer Emulsions," *Journal of Coatings Technology*, vol. 69, No. 875, Dec. 1977, pp. 49–55. The publication date is not available.

*Primary Examiner*—P. Hampton-Hightower
*Attorney, Agent, or Firm*—Hsiang-ning Sun

[57] ABSTRACT

The present invention relates to the preparation of water based coating compositions having extended storage stability. The composition includes separately stored polymeric binder component and a crosslinking component.

These components are mixed prior to application over surfaces, such as, road surfaces. The polymeric binder component includes an anionically stabilized binder polymer having at least one reactive functional pendent moiety, or a blend of the binder polymer with a polyfunctional amine. The pot mix of the coating composition has extended storage stability. The waterborne road marking paints of the present invention exhibit improved wear resistance on road surfaces in terms of paint remaining on the road longer than waterborne road marking paints based on the storage stable component alone. The present invention provides road marking paints that can be applied by conventional road striping equipment and do not require special two component spray equipment.

10 Claims, No Drawings

COATING COMPOSITION HAVING EXTENDED STORAGE STABILITY AND METHOD FOR PRODUCING WEAR RESISTANT COATINGS THEREFROM

This application claims the benefit of U.S. Provisional Appln. No. 60/027,377 filed Sep. 26, 1996.

This invention generally relates to a coating composition and to a method of producing coatings on substrates therefrom and, more particularly, to a multi-pack wear resistant traffic paint composition having extended storage stability and method for producing wear resistant traffic markings on a road surface therefrom.

White and yellow traffic markings used for demarcating traffic lanes is a common sight on almost all roads. These markings ensure safe driving conditions under varying weather conditions. The term "roads" generally means routes, highways, exit and entry ramps, passes, pavements, side walks, driveways or parking lots for vehicles, such as autos, bikes, and trucks. The roads are usually paved with asphalt or concrete, generally made from Portland cement. The majority of these traffic markings, such as solid, transverse or interrupted stripes, are paint-based and traditionally include solvent-borne binders, which are predominantly alkyds and chlorinated rubber-modified alkyds. Since traditional traffic paint coatings contain high levels [19 kilograms per kilometer per year (Environmental Protection Agency supplied data)] of volatile organic compounds (VOC), they contribute to ozone layer depletion which thereby endangers the environment. Under the increasingly stricter standards of The Clean Air Act, as amended in 1990, high levels of VOC produced by the traditional traffic paint coatings must be substantially reduced.

In the early 1980s, waterborne traffic paints began to receive serious consideration as an environmentally safer alternative to the traditional traffic paints. These waterborne traffic paints are primarily based on acrylic emulsions. In addition to dramatically lowering VOC emissions [3.7 kilograms per kilometer per year (Environmental Protection Agency supplied data)], they also improve retention of glass beads used in light reflective traffic markings. As a result, the useful life of the traffic markings on the roads is extended.

The waterborne traffic coating composition utilizing two components, which are mixed to form a pot mix prior to the coating application, are described in U.S. Pat. No. 4,812,493 to Cummings. However, the pot mix described by Cummings has a limited storage stability, defined below, of less than 30 seconds. As a result, these two components have to be mixed in a special paint spray equipment just prior to application on a road surface. The present invention solves this problem by providing a coating composition having extended pot life of up to 30 hours. As a result, conventional road spaying equipment can be utilized in applying the composition of the present invention to road surfaces.

Another problem associated with the waterborne traffic paint compositions is that they tend to be less wear resistant than traditional alkyd based traffic paints when exposed to traffic conditions, such as varied weather patterns, long term exposure to sunlight, and wear and tear resulting from exposure to vehicular traffic. The term "wear resistance" means the degree of resistance of film detachment from the road surface when it is exposed to the traffic conditions. The wear resistance is expressed as the percentage area of a film of traffic marking still remaining on the road surface after its extended exposure to such traffic conditions. Under American Society of Testing Materials, Philadelphia, Pa., (ASTM) Test No. D 713-90, a traffic marking is considered to have failed if less than 40 percent of the traffic marking at the end of a selected test period, typically one year, remains on the road surface when such a test marking is applied transverse to traffic for accelerating its wear. It has been found that a substantial portion of conventional waterborne traffic markings tend to wear away in less than few months after exposure to such accelerated traffic conditions. The coating composition of the present invention solves this problem by improving the wear resistance of the coating composition.

One of the advantages of the coating composition of the present invention is its fast dry characteristic, even under high humidity conditions.

The present invention is directed to a coating composition with extended storage stability comprising:

a polymeric binder component and a crosslinking component, wherein said polymeric binder component comprises:

an anionically stabilized binder polymer having at least one reactive functional pendent moiety, or a blend of said binder polymer within the range of from 0.01 to 20 weight percent based on the total weight of polymeric binder component solids of a polyfunctional amine; and wherein said composition with extended storage stability comprises said crosslinking component in a stoichiometric ratio varying in the range of from 0.05 to 10 of said crosslinking component in mole equivalents to total amount in mole equivalents of said reactive functional pendent moiety on said blend or said binder polymer.

The present invention is further directed to a method for producing a wear resistant coating on a substrate surface comprising:

mixing a polymeric binder component of an aqueous wear resistant coating composition with a crosslinking component of said coating composition to form a pot mix, said polymeric binder component comprising:

an anionically stabilized binder polymer having at least one reactive functional pendent moiety, or a blend of said binder polymer within the range of from 0.01 to 20 weight percent based on the total weight of polymeric binder component solids of a polyfunctional amine; said pot mix being mixed in a stoichiometric ratio varying in the range of from 0.05 to 10 of said crosslinking component in mole equivalents to total amount in mole equivalents of said reactive functional pendent moiety on said blend or said amine modified binder polymer;

applying a layer of said pot mix on a substrate surface;

drying said layer; and curing said layer to form said wear resistant coating on a substrate surface.

As used herein:

"GPC weight average molecular weight" means the weight average molecular weight determined by gel permeation chromatography (GPC), which is described on page 4, Chapter I of *The Characterization of Polymers,* published by Rohm and Haas Company, Philadelphia, Pa. in 1976. For polymers that are soluble in either tetrahydrofuran or dimethylformamide, polymethylmethacrylate is used as the molecular weight standard. For water soluble polymers, polymethacrylic acid is used as the standard. Prior to the GPC analysis of water soluble polymers, they are treated with potassium hydroxide in ethanol at elevated temperatures which are sufficient to fully hydrolyze the water soluble polymers. The weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of a binder polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate-initiated systems, we have used a factor of approximately 0.5). Further information on theoretical molecular weight calculations can be found in *Principles of Polymerization,* 2nd edition, by George Odian, published by John Wiley and Sons, N.Y., N.Y. in 1981, and in *Emulsion Polymerization,* edited by Irja Pirma, published by Academic Press, N.Y., N.Y. in 1982.

"Low GPC weight average molecular weight polymer" means a polymer having GPC weight average molecular weight in the range of 1,000 to less than 100,000.

"High GPC number average molecular weight polymer" means a polymer GPC number average molecular weight in the range of more than 100,000 to 1,000,000.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to 100° C., and then heated to 150° C. at a rate of 20° C./minute while data was being collected. The Tg was measured at the midpoint of the inflection using the half-height method. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1$, $M_2$, . . . $M_n$, from which the copolymer is derived by the $T_g$ value for the homopolymer derived from the respective monomer, according to an equation of the form:

$$1/T_{g(copolymer)} = \sum_{i=1}^{n} w_{(Mi)}/T_{g(Mi)} \quad (1)$$

wherein:

$T_{g(copolymer)}$ is the estimated glass transition temperature of the copolymer, expressed in degree Kelvin (°K);

$w_{(Mi)}$ is the weight fraction of repeat units in the copolymer derived from an $i^{th}$ monomer $M_i$; and $T_{g(Mi)}$ is the glass transition temperature, expressed in ° Kelvin (°K), of the homopolymer of an $i^{th}$ monomer $M_i$.

The glass transition temperature of various homopolymers may be found, for example, in *Polymer Handbook,* edited by J. Brandrup and E. H. Immergut, Interscience Publishers.

"Dispersed polymer" means particles of polymer colloidally dispersed and stabilized in an aqueous medium.

"Solubilized polymer" includes "Water soluble polymer", "Water reducible polymer" or a mixture thereof. "Water soluble polymer" means a polymer dissolved in an aqueous medium. "Water reducible polymer" means a polymer dissolved in water and water miscible solvent. Solubilized polymer results in a polymer solution characterized by having the self-crowding constant (K) of the Mooney equation [$1/\ln_{nrel}=1/BC-K/2.5$] equal to zero. By contrast, dispersed polymer has (K) equal to 1.9. The details of Mooney equation are disclosed in an article entitled "Physical Characterization of Water Dispersed and Soluble Acrylic Polymers" by Brendley et al., in *Nonpolluting Coatings and Coating Processes,* published by Plenum Press, 1973 and edited by Gordon and Prane.

"Opaque polymer" means colloidally dispersed and stabilized polymer particles, which act as opacifying agents in a dried state, wherein each particle therein contains at least one void.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled "Uses and Abuses of Photon Correlation Spectroscopy in Particle Sizing" by Weiner et al. in 1987 edition of the *American Chemical Society Symposium* series.

"Polymer or Pigment solids" means polymer or pigment in its dry state.

"Pigment volume content" means the volume percentage of pigment or opacifying polymer solids added to paint composition; volume percentage being based on the total volume of the paint composition.

"No-pick-up time" means the time it takes for a layer of wet traffic paint composition to dry out sufficiently such that no paint adheres to a free roll of the rubber test wheels described in ASTM test D 711-89 entitled "Standard Test for No-Pick-Up Time of Traffic Paint."

"Pot mix" means a mixture produced by mixing a polymeric binder component with a crosslinking component of a multi-pack coating composition.

"Storage stability" relates to the degree of fluidity retained by a pot mix of a coating composition. In order to be coatable, by conventional coating means, such as a spraying device or brush, the desired fluidity of the coating composition, expressed as a viscosity, should be less than 500 centipoise, preferably less than 300 centipoise. The viscosity is measured in accordance with the procedure described later. Once the coating composition loses its storage stability, the pot mix gels and becomes too viscous to be of any practical value as a coating composition.

The preferred embodiment of the coating composition of the present invention is a multi-pack, preferably a two-pack, composition which includes a polymeric binder component and a crosslinking component that are stored in separate containers. The polymeric binder component includes an anionically stabilized binder polymer having at least one reactive functional pendent moiety, or a blend of the binder polymer within the range of from 0.0 1 to 20 weight percent, preferably 0.1 to 10 weight percent, and more preferably 0.5 to 5 percent, based on the total weight of polymeric binder component solids of a protonated or deprotonated polyfunctional amine.

The polymeric binder component preferably includes a blend of a binder polymer within the range of from 0.01 to 20 percent, preferably in the range of from 0.1 to 10, and more preferably in the range of from 0.5 to 5 percent, of a polyfunctional amine, all in weight percentages based on the total weight of the polymeric binder component solids.

The anionically stabilized binder polymer may be provided with a Tg in the range of from –10° C. to 60° C., preferably in the range of from 15° C. to 40° C., a GPC weight average molecular weight ranging from 500 to 5,000,000, more preferably 100,000 to over 1,000,000, and most preferably ranging from 200,000 to 1,000,000. If the Tg of the binder polymer drops below 0° C., the resulting coating will have poor dirt pick-up resistance, and if the Tg of the binder polymer rises above 60° C., the resulting coating will require too much coalescent to form a film.

The binder polymer of the composition may be latex polymer particles dispersed in an aqueous evaporable carrier, or it may either be a water soluble polymer, a water-reducible polymer, or various mixtures thereof. The binder polymer in the form of a dispersed polymer having particles with a particle size in the range of 20 to 1,000 nanometers, preferably in the range of 30 to 300 nanometers. The aqueous evaporable carrier includes water or water having dissolved therein a low VOC water miscible organic solvent, such as methanol, ethanol and glycol ether. Water is preferred.

The binder polymer may be polymerized from at least one or more of the following monomers, such as, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth) acrylate, oleyl (meth)acrylate, palmityl (meth)acrylate, stearyl (meth)acrylate, hydroxyethyl (meth)acrylate, and hydroxypropyl (meth)acrylate; acid functional monomers, such as acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; diacetone acrylamide; glycidyl methacrylate; acetoacetyl ethylmethacrylate; acrolein and methacrolein; dicyclopentadienyl methacrylate; dimethyl metaisopropenyl benzyl isocyanate; isocyanato ethylmethacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N'-dimethylamino (meth)acrylate and acrylonitrile or methacrylonitrile.

At least one of the monomers utilized in the preparation of the binder polymer provides for a reactive pendent functional moiety, such as acid functional or amine functional pendent moieties, or a combination of the acid and amine functional pendent moieties. The reactive pendent functional moiety provided on the binder polymer is reactive with the crosslinking component of the coating composition.

The binder polymer containing the amine functional pendent moieties is polymerized in the range of from 20 weight percent to 100 weight percent, preferably in the range of from 50 weight percent to 100 weight percent, all based on the total weight of polymeric binder component solids of at least one amine monomer, several examples of which are described later in the specification.

The binder polymer polymerized from monomeric mixtures that include the following monomers is more preferred:
1) butyl acrylate and methyl methacrylate,
2) butyl acrylate and styrene,
3) 2-ethyl hexyl acrylate and methyl methacrylate,
4) 2-ethyl hexyl acrylate and styrene, and
5) butyl methacrylate and methyl methacrylate.

The polymerization techniques used for preparing the anionically stabilized binder polymer of the present invention are well known in the art. The binder polymer may be prepared by aqueous solution polymerization or emulsion polymerization. Emulsion polymerization is preferred. Either thermal or redox initiation processes may be used.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same free radical initiators coupled with a suitable reductant such as, for example, isoascorbic acid and sodium bisulfite may be used at similar levels.

Chain transfer agents may be used in an amount effective to provide a GPC weight average molecular weight of 500 to 5,000,000. For purposes of regulating molecular weight of the binder polymer being formed, suitable chain transfer agents include well known halo-organic compounds, such as carbon tetrabromide and dibromodichloromethane; sulfur-containing compounds, such as alkylthiols including ethandiol, butanediol, tert-butyl and ethyl mercaptoacetate, as well as aromatic thiols; or various other organic compounds having hydrogen atoms which are readily abstracted by free radicals during polymerization. Additional suitable chain transfer agents or ingredients include, but are not limited to, butyl mercaptopropionate; isooctyl mercaptopropionic acid; isooctylmercapto propionate; bromoform; bromotrichloromethane; carbon tetrachloride; alkyl mercaptans, such as 1-dodecanthiol, tertiary-dodecyl mercaptan, octyl mercaptan, tetradecyl mercaptan, and hexadecyl mercaptan; alkyl thioglycolates, such as butyl thioglycolate, isooctyl thioglycolate, and dodecyl thioglycolate; thioesters; or combinations thereof. Mercaptans are preferred.

When the binder polymer in the form of a dispersed polymer is utilized, the diameter of the polymer particles is controlled by the amount of conventional surfactants added during the emulsion polymerization process. Conventional surfactants include anionic, nonionic emulsifiers or their combination. Typical anionic emulsifiers include alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols.

Alternatively, the binder polymer may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase, and the interior of the latex polymer particle will be occupied by at least one inner phase. The outer phase of the multi-stage polymer particles weighs 5 weight percent to 95 weight percent based on the total weight of the particle. A GPC weight average molecular weight of these multi-stage polymer particles is in the range of from 500 to 5,000,000, preferably from 1,000 to 1,000,000.

The multi-stage polymer particles are prepared by a conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents and surfactants as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The binder polymer in the form of the water-reducible polymer or water-soluble polymer may be prepared directly in water if the monomer mix is water-soluble or, as is most often the case, the polymerization solvent is a water-miscible solvent, such as isopropanol, butyl cellosolve or propylene glycol. In such a case, water may be included in the polymerization mixture or post added after the polymerization is complete. Such polymers may be prepared by utilizing the monomers described earlier. Another route to preparation of a water-soluble polymer for this invention is to prepare a binder polymer having enough acrylic or methacrylic acid or other polymerizable acid monomer (usually greater than 10 percent) such that the binder polymer can be solubilized by the addition of ammonia or other base. Water-soluble polymers of this type are advantageously used as blends with the dispersed polymers.

The reactive functional pendent moiety of the binder polymer is preferably an acid functional pendent moiety sufficient to provide the binder polymer with an acid number in the range of from 0.8 to 130, preferably in the range of from 0.8 to 80, and more preferably in the range of from 0.8 to 30. The desired acid number is achieved by controlling the amount of acid functional monomer utilized in producing the binder polymer. The desired range of the acid number is obtained by utilizing the binder polymer containing an acid functional monomer, such as phosphoethyl methacrylate monomer or ethylenically-unsaturated carboxylic acid monomers, such as acrylic acid, fumalic acid-monoethyl ester, fumaric acid, itaconic acid, maleic acid, maleic anhydride, methacrylic acid, fumaric acid-monomethyl ester, methyl hydrogen maleate, 2-acrylamido-2-methylpropane sulfonic acid, sodium vinyl sulfonate, sulfoethyl methacrylate, or combinations thereof. Preferred ethylenically-unsaturated carboxylic acid monomer is selected from the group consisting of acrylic acid, methacrylic acid, and combinations thereof.

Typically, the polyfunctional amine suitable for use in the blend of the polymeric binder component or the polymer binder containing the amine functional pendent moiety are protonated. However, if desired, the polyfunctional amine suitable for use in the blend of the polymeric binder component or the polymer binder containing the amine functional pendent moiety may be maintained in a deprotonated state by raising the pH of the aqueous evaporable carrier of the polymeric binder component to the range of 9 to 11, preferably 9.5 to 10.5. The pH of the aqueous evaporable carrier is raised by adding ammonia, morpholine, the lower alkyl amines, 2-dimethylaminoethanol, N-methylmorpholine and ethylenediamine. Ammonia is preferred. As a result of deprotonation of amine functional groups in the polyfunctional amine, essentially all of amine functional groups are uncharged, i.e. neutralized, thus preserving colloidal stability of the polymeric binder component.

The polyfunctional amine may be polymerized from 20 percent to 100 percent, preferably 50 percent to 100 percent, all in weight percentages based on the total of the polyfunctional amine solids of at least one or more of the amine containing monomers, some examples of which include the members of the following classes:

1. Aminoalkyl vinyl ethers, wherein alkyl groups may be straight- or branched-chains having two to three carbon atoms and wherein nitrogen atom may be a primary, secondary, or tertiary nitrogen atom. Such a process is disclosed in U.S. Pat. No. 2,879,178. When the monomer containing a tertiary nitrogen atom is utilized, one of the remaining hydrogen atoms may be substituted by alkyl, hydroxyalkyl, or alkoxyalkyl groups, the alkyl components of which may have one to four carbon atoms, preferably only one carbon atom. Specific examples include: beta-aminoethyl vinyl ether; beta-aminoethyl vinyl sulfide; N-monomethyl-beta-aminoethyl vinyl ether or sulfide; N-monoethyl-beta-aminoethyl vinyl ether or sulfide; N-monobutyl-beta-aminoethyl vinyl ether or sulfide; and N-monomethyl-3-aminopropyl vinyl ether or sulfide.

2. Acrylamide or acrylic esters, such as those of the formula I:

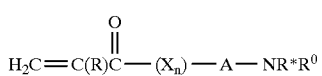

wherein
R is H or $CH_3$;
n is 0 or 1;
X is O or N(H).
When n is zero, A is $O(CH_2)_x$, wherein x is 2 to 3, or $(O\text{-alkylene})_y$; wherein $(O\text{-alkylene})_y$ is a poly(oxyalkylene) group having a GPC weight average molecular weight in the range from 88 to 348, in which the individual alkylene radicals are the same or different and are either ethylene or propylene; and
when n is 1, A is an alkylene group having 2 to 4 carbon atoms;
$R^*$ is H, methyl, or ethyl; and
$R^0$ is H, phenyl, benzyl, methylbenzyl, cyclohexyl, or $(C_1\text{–}C_6)$ alkyl.

Some of the preferred examples of compounds of formula I include:
dimethylaminoethylacrylate or methacrylate; beta-aminoethyl acrylate or methacrylate; tributyl aminoethylmethacrylate; 3-aminopropyl methacrylate; N-beta-aminoethyl acrylamide or methacrylamide; N-(monomethylaminoethyl)-acrylamide or methacrylamidedimethylaminoethylmethacrylamide; tributylaminoethylmethacrylamide; N-(mono-n-butyl)-4-aminobutyl acrylate or methacrylate; 3-aminopropylmethacrylate; methacryloxyethoxyethylamine; and acryloxypropoxypropoxypropylamine.

3. N-acryloxyalkyl-oxazolidines and N-acryloxyalkyltetrahydro-1,3-oxazines and the corresponding components in which the "alkyl" linkage is replaced by alkoxyalkyl and poly(alkoxy-alkyl), all of which are embraced by Formula II:

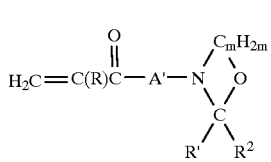

wherein R is H or $CH_3$;
m is an integer having a value of 2 to 3;
$R^1$, when not directly joined to $R^2$, is selected from the group consisting of hydrogen, phenyl, benzyl and $(C_1\text{–}C_{12})$ alkyl groups;
$R^2$, when not directly joined to $R^1$, is selected from the group consisting of hydrogen and $(C_1\text{–}C4)$ alkyl groups;
$R^1$ and $R^2$, when directly joined together, form a 5- to 6-carbon ring with the attached carbon atom of the ring in the formula, i.e. $R^1$ and $R^2$, when joined together, are selected from the group consisting of pentamethylene and tetramethylene; and A' is O(CmH2m)— or (O-alkylene)$_n$ in which (O-alkylene)$_n$ is a poly(oxyalkylene) group, having a GPC weight average molecular weight in the range from 88 to 348, in which the individual alkylene radicals are the same or different and are either ethylene or propylene.

The compounds of Formula II can hydrolyze under various conditions to secondary amines. The hydrolysis produces products having the Formula III:

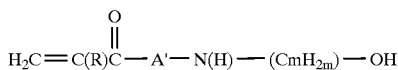
III

The compounds of Formula III are disclosed in U.S. Pat. Nos. 3,037,006 and 3,502,627 in the hands of a common assignee, and their corresponding foreign applications, and patents and any of the monomeric compounds disclosed therein may be used in making the copolymers to be used in the composition of the present invention.

Some of the preferred examples of compounds of Formula III include:

oxazolidinylethyl methacrylate; oxazolidinylethyl acrylate; 3-(gamma-methacryl-oxypropyl)-tetrahydro-1,3-oxazine; 3-(beta-methacryloxyethyl)-2,2-penta-methylene-oxazolidine; 3-(beta-methacryloxyethyl-2-methyl-2-propyloxazolidine; N-2-(2-acryloxyethoxy)ethyl-oxazolidine; N-2-(2-methacryloxyethoxy)ethyl-oxazolidine; N-2-(2-methacryloxyethoxy)ethyl-5-methyl-oxazolidine; N-2-(2-acryloxyethoxy)ethyl-5-methyl-oxazolidine; 3-[2-( 2-methacryloxyethoxy)ethyl)]-2,2-penta-methylene-oxazolidine; 3-[2-(2-(methacryloxyethoxy)ethyl)]-2,2-dimethyloxazolidine; 3-[-2-(methacryloxyethoxy)ethyl]-2-phenyl-oxazolidine; 2-isoprop enyl-2-oxazoline.

4. Polymers of monomers which readily generate amines by hydrolysis are useful in the preparation of the polyfunctional amine. Examples of such monomers are acryloxy-ketimines and acryloxy-aldimines, such as those of the Formulas IV and V shown below:

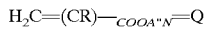  IV

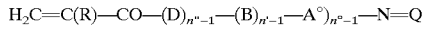  V wherein R is H or CH$_3$;
Q is selected from the group consisting of

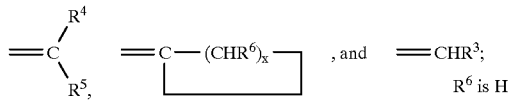

or it may be methyl in one CHR$_6$ unit;
R$^5$ is selected from the group consisting of (C$_1$–C$_{12}$)-alkyl and cyclohexyl groups;
R$^4$ is selected from the group consisting of (C$_1$–C$_{12}$)-alkyl and cyclohexyl
R$^3$ is selected from the group consisting of phenyl, halophenyl,
(C$_1$–C$_{12}$)-alkyl, cyclohexyl, and (C$_1$–C$_4$) alkoxyphenyl groups;
A" is an alkylene group (C$_1$–C$_{12}$);
A°, B and D are the same or different oxyalkylene groups having the formula —OCH(R$^7$)—CH(R$^7$)— wherein R$^7$ is H, CH$_3$, or C$_2$H$_5$;
x is an integer having a value of 4 to 5;
n° is an integer having a value of 1 to 200;
n' is an integer having a value of 1 to 200; and
n" is an integer having a value of 1 to 200, the sum of n°–1, n'–1 and n"–1 having a value of 2 to 200.

Some of the preferred examples of compounds of Formula IV and V include:

2-[4-(2,6-dimethylheptylidene)-amino]-ethyl methacrylate;
3-[2-(4-methylpentylidine)-amino]-propyl methacrylate;
beta-(benzylideneamino)-ethyl methacrylate;
3-[2-(4-methylpentylidene)-amino]-ethyl methacrylate;
2-[4-(2,6-dimethylheptylidene)-amino]-ethyl acrylate;
12-(cyclopentylidene-amino)-dodecyl methacrylate;
N-(1,3-dimethylbutylidene)-2-(2-methacryloxyethoxy)-ethylamine;
N-(benzylidene)-methacryloxyethoxyethylamine;
N-(1,3-dimethylbutylidene)-2-(2-acryloxyethoxy)-ethylamine; and
N-(benzylidene)-2-(2-acryloxyethoxy)ethylamine.

The compounds of Formulas IV and V hydrolyze in acid, neutral or alkaline aqueous media to produce the corresponding primary amines or salts thereof in which the group —N=Q of the formulas becomes —NH$_2$ and O=Q. The compounds of Formulas V and VI are disclosed in U.S. Pat. Nos. 3,037,969 and 3,497,485 and any of the monomeric compounds therein disclosed may be used in the making of the copolymers to be used in water-soluble polymer portion of the compositions of the present invention.

In general, the polyfunctional amines may be obtained by solution polymerization in aqueous media, either neutral, alkaline or acidic, depending upon the particular polymer sought, as generally known in the art, for example, in accordance with the method taught in U.S. Pat. No. 4,119, 600. Generally, the polymerization is carried out in an aqueous medium containing a small amount of an acid, either organic or inorganic, such as acetic acid or hydrochloric acid. The polyfunctional amines include copolymers with up to 80 percent by weight of one or more monoethylenically unsaturated monomers, such as methyl acrylate, acrylamide and methacrylamide. Small amounts of relatively insoluble comonomers may also be used to obtain the water-soluble polyfunctional amines. The insoluble polymers may contain larger amounts of these comonomers. Such monomers include, for example, acrylic acid esters with (C$_1$ to C$_{18}$) alcohols and methacrylic acid esters with alcohols having one to 18 carbon atoms, especially (C$_1$–C$_4$) alkanols; styrene; vinyltoluene; vinyl acetate; vinyl chloride; vinylidene chloride; alkyl substituted styrenes, butadiene; alkyl substituted butadienes; ethylene; and the nitriles and amides of acrylic acid or of methacrylic acid. The particular comonomer or comonomers used in making the polyfunctional amines depends upon the proportion of amine-containing monomer used in making the copolymer.

The polyfunctional amine also includes polyalkylene imines, such as polyethylene imines and polypropylene imines.

The polyfunctional amine also includes any non-polymelic polyfunctional amine having at least 2 primary or secondary amino groups. Such amines include aliphatic and cycloaliphatic amines, each having 2 to 10 primary or secondary amino groups and 2 to 100 carbon atoms. Preferred non-polymeric polyfunctional amines include 2 to 5 primary or secondary amino groups and 2 to 20 carbon atoms. Still further in this regard, suitable non-polymelic polyfunctional amines include, but are not limited to, hexamethylene diamine; 2-methyl pentamethylene diamine; 1,3-diamino propane; 1,3-diamino pentane; dodecane diamine; 1,2-diamino cyclohexane; 1,4-diamino cyclohexane; para-phenylene diamine; 3-methyl piperidine; piperazine; N-amino ethylpiperazine; isophorone diamine; bis-hexamethylene triamine; diethylene triamine; ethylene diamine; diethylamine triamine; triethylene tetramine; tris (2-aminoethyl) amine; ethylene oxide-amine; polyoxyalkylene amines, such as Jeffamine® D, ED and T series polyoxypropylene amine supplied by Texaco Chemical Company of Houston, Tex.; amine-functional acrylic resins, disclosed in U.S. Pat. No. 4,120,839; trimethyl hexamethylene diamine; and tetraethylene pentamine. Mixtures of these non-polymeric polyfunctional amines can also be used. The most preferred non-polymeric polyfunctional amine is a polyoxypropylene amine having the formula:

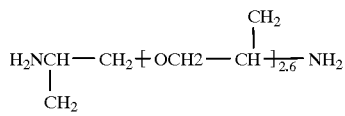

which is supplied under the trademark Jeffamine® D-230 polyoxypropylene amine by Texaco Chemical Company, Houston, Tex.

In another embodiment of the present invention, the reactive moieties pendent to the binder polymer may include amine functional moieties introduced by post functionalizing the binder polymer.

If desired, the amine functional reactive moieties pendent to the binder polymer may be introduced by post-reacting a binder polymer polymerized from in the range of 0.5 percent to 20 percent, preferably in the range of from 0.5 percent to 12 percent, of monomers containing 1,3-dicarbonyl moieties with polyamines which contain, per molecule, one and only one amine capable of reacting with 1,3-dicarbonyl compounds to form enamines, and at least one other amine which is incapable of reacting with 1,3-dicarbonyl compounds to form enamines, all in weight percentages based on total weight of polymer solids. The ratio of 1,3-dicarbonyl groups, such as acetoacetoxy ethyl methacrylate, to amines which are incapable of reacting with 1,3-dicarbonyl compounds to form enamines may be varied in the range of from 20:1 to 1:3, preferably in the range of from 8:1 to 1:1. Examples of such suitable polyamines are N-propylethylenediamine, N-butylethylenediamine, N-(1-ethanol)-ethylenediamine, N-ethyl-propylenediamine, N-ethylpiperazine and N-ethyl diethylenetriamine. Preferably, the amine groups which are incapable of reacting with 1,3-dicarbonyl compounds to form enamines are secondary amines.

If desired, the amine functional reactive moieties pendent to the binder polymer may be introduced by post-reacting a binder polymer polymerized from in the range of from 0.5 percent to 20 percent, preferably in the range of from 0.5 percent to 12 percent, of monomers containing isocyanate moieties, all in weight percentages based on total weight of polymer solids with polyfunctional amines. Examples of isocyanate functional monomers include isocyanatoethyl (meth)acrylate and preferably 3-isopropenyl-a,a-dimethylbenzyl isocyanate. The polyfunctional amines contain, per molecule, at least two primary and secondary amines, or at least two primary or secondary amines, which are capable of reacting with the isocyanate groups to form ureas. The ratio of isocyanate groups to polyfunctional amine molecules may be varied in the range of from 5:1 to 1:5, preferably in the range of from 1:1 to 1:3.

If desired, the amine functional reactive moieties pendent to the binder polymer may be introduced by post-reacting a binder polymer polymerized from in the range of from 0.5 percent to 20 percent, preferably in the range of from 1 percent to 10 percent, of monomers containing epoxy moieties, such as glycidyl (meth)acrylate, all in weight percentages based on total weight of polymer solids with any amines, including polyfunctional amines. The ratio of epoxy moieties to amine moieties may be varied in the range of from 5:1 to 1:5, preferably in the range of from 1:1 to 1:3.

If desired, the amine functional reactive moieties pendent to the binder polymer may be introduced by post-reacting a binder polymer polymerized from in the range of from 0.5 percent to 20 percent, preferably in the range of from 1 percent to 5 percent, of monomers containing carboxylic acid moieties, such as (meth)acrylic acid, or itaconic, fumaric, maleic acids or their half esters, with aziridines, such as ethyleneimine, propyleneimine, or 1-(2-hydroxyethyl)ethyleneimine, all in weight percentages based on total weight polymer solids. The ratio of carboxylic acid moieties to aziridine moieties may be varied in the range offrom 10:1 and 1:1, preferably in the range offrom 2:1 and 1:1.

The polymeric binder component contains in the range of from 35 percent to 65 percent, preferably in the range of from 45 to 60 percent of the blend in the aqueous evaporable carrier when the binder polymer is the dispersion of polymer particles, and in the range of from 25 to 50 percent, preferably in the range of from 30 to 40 percent of the blend in the aqueous evaporable carrier when a binder polymer is the solubilized polymer, all in weight percentages based on the total weight of the polymeric binder component.

If desired and depending on the intended use of the polymeric binder component composition, additional components may be added to the composition. These additional components include, but are not limited to, thickeners; biocides; dispersants; pigments, such as opaque polymer and titanium dioxide which provide white color, organic and lead chromate pigments, which provide yellow color; extenders, such as calcium carbonate, talc, clays, silicas and silicates; fillers, such as glass or polymeric microspheres and quartz sand; anti-freeze agents; plasticizers; adhesion promoters; coalescents; wetting agents; defoamers; colorants; soaps; preservatives and freeze or thaw protectors.

The crosslinking component of the composition of the present invention is capable of crosslinking with the reactive functionality of the latex polymer in the polymeric component; therefore, it is stored separately from the polymeric binder component until the user is ready for a coating application. Generally, the crosslinking component is stored in a separate container from a container used for storing the polymeric component. The crosslinking component of the present composition is stoichiometrically matched against the reactive groups, such as amine or acid groups present in the polymeric binder component. The composition of the present invention includes in a stoichiometric ratio varying in the range of from 0.05 to 10 of the crosslinking component in mole equivalents to total amount in mole equivalents of the blend. The stoichiometlic ratio varies preferably in the range of from 0.05 to 8, more preferably in the range of from 0.1 to 2. Preferably, the crosslinking component is in a liquid state at ambient temperature, i.e. the temperature at which the coating composition is mixed in the pot mix prior to application. Such a temperature is preferably 5° C. to 40° C. The crosslinking component may be emulsified in water, or dissolved in water with a cosolvent, such as ethylene glycol monobutyl ether. The crosslinking component, which is insoluble, is also suitable, provided its molecular weight is less than 500. The crosslinking component dissolved in water is preferred. Some of the suitable crosslinking components include one or more of the following:

Reaction products of epichlorohydrin with bisphenol A or bisphenol F containing at least two oxirane rings; epoxidized novolac resins formed by reaction of epichlorohydrin with the reaction product of phenol with formaldehyde, such as resins (D.E.R 400 series from Dow); epoxy terminated polyethers (D.E.R 732 and D.E.R 736 from Dow); cycloahphatic epoxy resins, aliphatic epoxy resins (EPI-REZ 501, EPI-REZ 5022, EPI-REZ 5044 from Hi-Tek Polymers); reaction products of epichlorohydrin and an aliphatic polyol, such as glycerol; epoxysilanes, such as 2-(3,4-epoxycyclohexyl)ethyl trimethoxysilane, (3-glycidoxypropyl)-trimethoxysilane, and beta-(3,4-epoxycyclohexyl)-ethyltrimethoxysilane (An epoxysilane is defined as a molecule which contains at least one oxirane ring and at least one Si atom. Preferably, the epoxysilane will contain at least one Si—O—C bond).

In another embodiment of the present invention, the polymeric binder component of the present invention includes from 0.1 percent to 10 percent, preferably from 0.5 percent to 10 percent, all in weight percentages of an amine modified binder polymer, which is prepared by copolymerization of monomers suitable for producing binder polymer, described earlier, with monomers suitable for producing polyfunctional amines, described earlier. As a result, a binder polymer modified with amine functional pendent moiety attached thereto is produced. A monomeric mixture containing monomers suitable for producing the binder polymer is mixed with from 0.1 percent to 10 percent, preferably in the range of from 0.5 percent to 5 percent, of amine functional monomers, described earlier.

In yet another embodiment of the present invention, the polymeric binder component of the present invention includes a combination of from 30 percent to 80 percent, preferably 50 percent, of the blend of the binder polymer and the polyfunctional amine, described earlier, with 70 percent to 20 percent of the amine modified binder polymer, all in weight percentages based on the total weight of the polymeric binder component solids.

The water-based fast dry coating composition of the present invention is suitable as a traffic paint composition which produces a traffic marking on road surfaces having wear resistance. The present composition is also suitable for producing traffic markings on road surfaces having thickness in the range of from 150 micrometers to 1500 micrometers.

The water-based low VOC coating composition of the present invention is also suitable for use in inks; adhesives; sealants; maintenance coatings, including those applied over previously coated surfaces; coatings over cement blocks, cement plaster, cement tiles; coatings over metal surfaces, such as cargo containers, automobile bodies, appliances, tools, aluminum and steel coils, sidings, doors, windows; coatings over wood surfaces, such as doors, windows, panelings, cabinets, shelvings, furniture; coatings over paper substrates; coatings over woven and non-woven fabrics, including garments, carpets and curtains.

The present invention is also directed to producing a wear resistant coating, such as a traffic marking, on a substrates surface, such as roads. The first step of the method of the preferred embodiment of the present invention is directed to mixing the polymeric binder component of an aqueous wear resistant coating composition, such as traffic paint composition, with the crosslinking component thereof to form a pot mix. Applicants have unexpectedly discovered that the pot mix of the present composition has significantly longer pot life, having a storage stability of up to 30 hours from the mixing step. By contrast, most of the commercial low VOC two component compositions form pot mixes that have a storage stability of about 30 seconds to 10 minutes.

The second step of the present invention is directed to applying on the substrate surface a layer of the pot mix. The layer of the coating composition may be applied by the methods known in the art, such as, for example, by spraying the composition on the road surface by means such as truck mounted spray guns where the paint composition is supplied from an air pressurized tank or by means of an airless pump. If desired, the traffic paint composition may be hand-applied by means of a paint brush or a paint roller. It is contemplated that the road surface on which the layer of the waterborne traffic paint composition is applied is preferably cleaned by removing any dirt or sediments prior to the application of the waterborne traffic paint composition. The thickness of the layer of the waterborne traffic paint composition generally varies from 300 micrometers to 3,000 micrometers, preferably from 350 micrometers to 1000 micrometers.

The third step of the method of the present invention is drying the layer. During the drying step, the aqueous evaporable carrier is evaporated from the layer applied to the road surface. The rate of evaporation of the aqueous evaporable carrier is dependent upon the ambient conditions to which the layer of the traffic paint composition is exposed to and also upon the thickness of the layer applied to the road surface. Higher the atmospheric humidity, longer will be the no-pick-up time for layer of the present composition, as evaluated under ASTM D 711-89. When the relative humidity is in the range of 65 percent to 90 percent, the no-pick-up time for the layer of the present composition varies in the range of from 1 minute to 60 minutes, preferably in the range of from 1 minute to 20 minutes, and most preferably in the range of from 1 minute to 10 minutes from the application of the layer.

The fourth step of the present invention is curing the dried layer to form the wear resistant coating, such as traffic marking, having improved wear resistance. During the curing step, the reactive functionality on the binder polymer is believed, without reliance thereon, to substantially crosslink with the crosslinking component, thereby resulting in the water resistant coating. The rate of cure depends upon the atmospheric temperature. Higher the atmospheric temperature, shorter will be the cure time for wear resistant coating of the present composition. When the atmospheric temperature is in the range of 7° C. to 49° C., the cure time varies in the range of from 3 months to 5 hours.

It is conventional to facially dispose glass beads in the traffic markings, which act as light reflectors. If glass beads are not used, the traffic markings would be difficult to see under night and wet weather conditions. Thus, almost all of the traffic markings are beaded, i.e. glass beads sprinkled and embedded in the traffic markings roughly at the rate of 0.72 to 2.9 kilograms or more per liter of traffic paint for night and wet weather visibility. Optionally, glass beads may be premixed with traffic paint before the paint is applied to road surfaces.

The method of the present invention may further include dropping glass beads on the layer of the traffic paint composition of the present invention before the layer is dry to ensure the adhesion of the glass beads to the layer applied to the road surface. The glass beads are dropped by methods known in the art, such as by spraying the glass beads entrained and conveyed by a jet of air and dropped atop the layer or by sprinkling the glass beads at a desired rate from a storage hopper positioned above the layer of the traffic paint composition of the present invention. The glass beads are applied over the layer while the layer is still "wet", i.e. before the layer dries up to form the traffic paint marking. The amount of glass beads dropped on the layer is dependent upon the size, refractive index and surface treatment of the glass beads. The typical glass beads specified for traffic markings are described under AASHTO Designation M 247-81 (1993) developed by American Association of State Highway and Transportation Officials, Washington, D.C.

If desired, the no-pick-up time for the layer of the traffic paint composition of the present invention may be further reduced by contacting the layer with a coagulant, which includes weak acids, such as aqueous acetic or citric acid, at a strength in the range of 10 percent to 30 percent, more preferably at 20 percent or stronger acids, such as hydrochloric or sulfuric acids, diluted to a strength in the range of 5 to 15 percent, preferably 10 percent. Citric acid is preferred. The coagulant is applied by the methods known in the art, such as, for example, by spraying the coagulant on the layer. It is believed, without reliance thereon, that the coagulant, when contacted with the layer, coagulates the binder polymer present in the layer to improve the drying rate of the layer. The amount of the coagulant sprayed on the layer depends upon the amount of the binder polymer present in the layer and also upon the type of the binder polymer used in the traffic paint composition. The amount in weight percent of the coagulant sprayed on the layer of the coating composition depends upon the type of acid, its strength and the type of spraying equipment used in carrying out the coagulation step. The coagulant, such as citric acid at 20 percent strength, applied at the rate in the range of from 0.6 percent to 2 percent, preferably at 1 percent, all in weight percentages, based on the total weight of the coating composition applied as a layer, is suitable.

TEST PROCEDURES

The following test procedures were used for generating the data reported in the Examples below:

1. The Wear Resistance Test

The wear resistance of the traffic paint markings, produced in accordance with the method of the present invention, were evaluated under ASTM D 913-88, entitled *Standard Test Method for Evaluating Degree of Resistance to Wear of the Traffic Paint*. The traffic markings, also known as test tracks, were prepared and applied in accordance with ASTM D 713-90. The glass beads used on test markings were in conformance to AASHTO Designation M 247-81 (1993), published by American Association of State Highway and Transportation Officials, Washington, D.C.

Layers of the white traffic paint composition of Examples, described below, were spray applied transversely to the direction of traffic flow, i.e. perpendicular to the flow of traffic to a thickness of 380 micrometers over a Portland cement road by means of a walk behind, self-propelled striping machine, supplied by Linear Dynamics, Inc., Parsimony, N.J. The reason for applying the test tracks in a direction transverse to the traffic flow was to accelerate the degradation of test tracks by increasing the number of vehicle passes over the test tracks, particularly where the vehicle tires pass most frequently, which is defined as "wheel track area." Glass beads, sold under the name Highway Safety Spheres with Adherence Coating AC-7', supplied by Potters Industries, Inc., Carlstadt, N.J., were dropped on the layer of the white traffic paint composition. The wear resistance of the test tracks to the road surface was observed 106 days after their application to the road surface.

2. Measurement of Storage Stability of the Pot Mix by Viscosity Measurement

The pigmented polymer component is mixed with the desired stoichiometric amount of crosslinking component, thereby making the pot mix. The viscosity of the pot mix was measured initially, in accordance with ASTM D 4287-88, entitled *Standard Test Method for High-Shear Viscosity Using the ICI/Cone/Plate Viscometer*, and then again after 4 hours to determine the storage stability of the pot mix. A viscosity expressed in centipoise (cp) in the range of 100 to 500 cp is considered to be in a sufficiently fluid state to be sprayable by means of conventional spray equipment.

3. No-Pick-up Time Test

A 500 micrometer thick layer of the pot mix of the pigmented version of coating composition, described below, was applied over 10 cms×30 cms glass test panels by the method described below. The thickness of the layer was controlled in such a way that the resultant (after drying) traffic marking thereon would have a film thickness varying from 200 to 275 micrometers. The no-pick-up time of the layer was determined in accordance with ASTM #D711, by rolling a traffic paint drying time wheel over the wet layer. The end point for no-pick-up time is defined as the point where no paint adheres to the rubber rings of the test wheel.

4. Abrasive Scrub Resistance Test

ASTM D 4213—Paint was drawn down on a scrub test panel supplied by Leneta Company at a wet film thickness of 178 micrometers (7 mil) and allowed to dry at room temperature. The test panel was placed on an Abrasion Test Machine supplied by Gardner Laboratories. Standardized scrub medium supplied by Leneta Company and water were applied to the brush of the Abrasion Test Machine, the brush was then caused to move across the film in a reciprocating manner until it broke through the paint film. The number of passes of the brush required for failure of the paint film was recorded. Higher number of brush passes, called "rubs" indicated higher scrub resistance.

EXAMPLE 1

A stirred reaction kettle containing 914 grams of deionized water was heated under nitrogen atmosphere to 85° C. To the heated kettle, 15.5 grams of sodium lauryl sulfate, 7.6 grams of sodium carbonate and 7.8 grams of sodium persulfate were added. A monomer emulsion mixture was prepared by mixing 869 grams of deionized water with 15.5 grams of sodium lauryl sulfate, 992 grams of butyl acrylate, 1155 grams of methyl methacrylate, and 28.3 grams of methacrylic acid. 180 grams of the monomer emulsion mixture was then added to the heated kettle. The remainder of the monomer emulsion mixture was then gradually added to the reaction kettle, followed by 50 grams of deionized water. The reaction kettle was then cooled and 0.01 grams of ferrous sulfate dissolved in 1 gram of deionized water was added, followed by a total of 1.76 grams of tertiary butyl-hydrogen peroxide dissolved in 40 grams of deionized water and 0.88 grams of sodium sulfoxylate formaldehyde dissolved in 30 grams of deionized water. Following this addition, 50 grams of aqueous ammonia was added. Finally, 95.4 grams of 27% solids by weight of aqueous solution of polyoxazolidinoethylmeth-acrylate, followed by 70 grams of deionized water were added to the reaction kettle to complete the process.

The binder polymer of Example 1 had a particle size of 180 nm, a solids content of 50% by weight, a pH of 9.9, and a viscosity of less than 250 centipoise.

EXAMPLE 2

A stirred reaction kettle containing 914 grams of deionized water was heated under nitrogen atmosphere to 85° C. To the heated kettle, 15.5 grams of sodium lauryl sulfate, 7.6 grams of sodium carbonate and 7.8 grams of sodium persulfate were added. A monomer emulsion mixture was prepared by mixing 869 grams of deionized water with 15.5 grams of sodium lauryl sulfate, 992 grams of butyl acrylate, 1155 grams of methyl methacrylate and 28.3 grams of methacrylic acid. 180 grams of the monomer emulsion mixture was then added to the heated kettle. The remainder of the monomer emulsion mixture was then gradually added to the reaction kettle, followed by 50 grams of deionized water. The reaction kettle was then cooled and 0.01 grams of ferrous sulfate dissolved in 1 gram of deionized water was added, followed by a total of 1.76 grams of tertiary butyl-hydrogen peroxide dissolved in 40 grams of deionized water and 0.88 grams of sodium sulfoxylate formaldehyde dissolved in 30 grams of deionized water. Following this addition, 50 grams of aqueous ammonia was added.

The binder polymer of Example 2 had a particle size of 180 nm, a solids content of 52.5% by weight, a pH of 9.9, and a viscosity of less than 250 centipoise.

EXAMPLE 3

To a 5-liter reactor containing 1224.6 g of deionized water (DI water) under a nitrogen atmosphere at 81° C., 4.7 g of sodium dodecylbenzene sulfonate (23% active), 67.7 g of monomer emulsion, disclosed in Table 1 below, 3.2 g sodium carbonate dissolved in 60 g DI water and 3.2 g ammonium persulfate dissolved in 50 g DI water were added with stirring. The remainder of monomer emulsion No. 1 and a solution of 3.2 g ammonium persulfate dissolved in 100 g DI water were gradually added over a period of 162 minutes. At the end of the feeds, 50 g of DI water was added to rinse the monomer emulsion feed line. After cooling to 60° C., 9.0 g of an aqueous solution of ferrous sulfate heptahydrate (0.15%), 1.6 g t-butylhydroperoxide (70% active ingredient) in 20 g DI water and 0.8 g of sodium sulfoxylate formaldehyde dihydrate in 20 g DI water were added. The sample was neutralized with ammonium hydroxide.

TABLE 1

Monomer Emulsion No. 1

| | in grams |
|---|---|
| DI water | 541.1 |
| sodium dodecylbenzene sulfonate (23%) | 19.7 |
| butyl acrylate | 1080.0 |
| methylmethacrylate | 1051.9 |
| methacrylic acid | 28.1 |

The binder polymer of Example 3 had a solids content of 50.0%, a Brookfield viscosity of 94 cps (spindle 3 at 60 rpm using a Brookfield Model LVTD Viscometer), particle size 225 nm, GPC weight average molecular weight of 523,036 (high molecular weight) and pH 10.3.

EXAMPLE 4

To a 5-liter reactor containing 1257.0 g of deionized water (DI water) under a nitrogen atmosphere at 81° C., 4.7 g of sodium dodecylbenzene sulfonate (23% active), 67.7 g of monomer emulsion, disclosed in Table 2 below, 3.2 g sodium carbonate dissolved in 60 g DI water and 3.2 g ammonium persulfate dissolved in 50 g DI water were added with stirring. The remainder of monomer emulsion No. 2 and a solution of 3.2 g ammonium persulfate dissolved in 100 g DI water were gradually added over a period of 175 minutes. At the end of the feeds, 50 g of DI water was added to rinse the monomer emulsion feed line. After cooling to 60° C., 9.0 g of an aqueous solution of ferrous sulfate heptahydrate (0.15%), 1.6 g t-butylhydroperoxide (70% active ingredient) in 20 g DI water and 0.8 g of sodium sulfoxylate formaldehyde dihydrate in 20 g DI water were added. The sample was neutralized with ammonium hydroxide.

TABLE 2

Monomer Emulsion No. 2

| | in grams |
|---|---|
| DI water | 541.1 |
| sodium dodecylbenzenesulfonate (23%) | 19.7 |
| butyl acrylate | 1080.0 |
| methylmethacrylate | 1051.9 |
| methacrylic acid | 28.1 |
| n-dodecylmercaptan | 32.4 |

The binder polymer of Example 4 had a solids content of 49.9%, a Brookfield viscosity of 122 cps (spindle 3 at 60 rpm using a Brookfield Model LVTD Viscometer), particle size 198 nm, GPC weight average molecular weight of 35,375 (how molecular weight) and pH 10.3.

EXAMPLE 5

To a 2-liter reactor containing 600 g of DI water under a nitrogen atmosphere at 60° C., 2.8 g of an aqueous solution of ferrous sulfate heptahydrate (0.15%) and 0.8 g of an aqueous solution of the tetrasodium salt of ethylenediamine tetraacetic acid (1%) diluted with 10 g DI water were added with stiriing. A feed of composed of 200 g 2-(3-oxazolidinyl)ethyl methacrylate (OXEMA) and 100 g DI water was added over a 2 hour period. Simultaneously, feeds composed of 2 g t-butylhydroperoxide (70% active) dissolved in 23 g DI water and 2 g sodium sulfoxylate formaldehyde dihydrate dissolved in 23 g DI water were added over a 2 hour period. After completion of the feeds, the reaction was held at 60° C. for 30 minutes, then 0.16 g of t-butylhydroperoxide (70% active) dissolved in 10 DI water was added. Fifteen minutes later, 0.1 g of t-butylhydroperoxide (70% active) dissolved in 10 g DI water, and 0.06 g sodium sulfoxylate formaldehyde dihydrate dissolved in 10 g DI water were added. Fifteen minutes later, the reaction was cooled to room temperature. The polyfunctional amine had a pH of 8.2, solids content of 17.6% and a Brookfield viscosity (spindle 2 at 60 rpm) of 30 cps.

EXAMPLES 6 AND 7

To Examples 1 and 2, the following components were added in the order shown to prepare Examples 6 and 7:

| | Amount (grams per liter) | |
|---|---|---|
| Material | Example 6 | Example 7 |
| Example 1 at 50 percent solids | 386.6 | |
| Example 2 at 52.5 percent solids | | 386.6 |
| DI Water | 20.7 | 20.7 |
| Dispersant[1] | 7.4 | 7.4 |
| Surfactant[2] | 2.9 | 2.9 |
| Defoamer[3] | 2.1 | 2.1 |
| White Pigment[4] | 103.4 | 103.4 |
| Extender[5] | 786.5 | 786.5 |

Unless stated otherwise, the following commercial components were used:
[1]Tamol ® 901 Dispersant, an ammonium salt of polyelectrolyte supplied by Rohm and Haas Company, Philadelphia, Pennsylvania @ 30 percent by weight.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chemical Company, Boonton, New Jersey.

-continued

| | Amount (grams per liter) | |
|---|---|---|
| Material | Example 6 | Example 7 |

[4]Ti Pure ® R-900 Titanium dioxide supplied by E.I. duPont de Nemours & Company, Wilmington, Delaware.
[5]Omyacarb ® 5, Ground natural calcium carbonate, evaluated under ASTM D 1199, Type GC, Grade 11 having a number average particle size of 5.5 microns with maximum oil absorption No. of 10, supplied by Omya, Inc., Proctor, Vermont.

The components were mixed for 10 minutes or until smooth (the fineness of grind as tested according to ASTM D1210 of not less than 3 Hegman units) to form a mix to which the following component were added in the order shown with continuous mixing:

| | Amount (grams per liter) | |
|---|---|---|
| Material | Example 6 | Example 7 |
| Methanol | 25.8 | 25.8 |
| Coalescing solvent[6] | 9.2 | 9.2 |
| Defoamer[3] | 3.6 | 3.6 |

Unless stated otherwise, the following commercial components were used:
[6]Texanol ® Ester alcohol supplied by Eastman Chemicals, Kingsport, Tennessee.

EXAMPLE 8

Example 8, which formed the polymeric binder component, was mixed at the job site with 23 percent by weight based on the composition solids of a crosslinking component[7] of the coating composition.
Unless stated otherwise, the following commercial components were used:
[7]Daubond® DC-9010W55 Emulsified Epoxy @ 55 percent solids supplied by Daubert Chemical Co., Chicago, Ill.

Wear Resistance Evaluation

Examples 6, 7 and 8 were evaluated. The results are tabulated below:

TABLE 3

| Example | % of Crosslinking Component | Paint area in percentage remaining on road surface No glass beads added | Paint area in percentage remaining on road surface Glass beads added |
|---|---|---|---|
| 6 | 0 | 35 | 55 |
| 7 | 0 | 0 | 0 |
| 8 | 23 | 55 | 85 |

From Table 3, it is seen that applicants have unexpectedly discovered that the polymeric binder component based on the blend of the latex polymer with the polyfunctional amine has better wear resistance than the polymeric binder component containing no polyfunctional amine. Furthermore, applicants have unexpectedly discovered that the polymeric binder component based on the blend of the latex polymer with the polyfunctional amine mixed with the crosslinking component gives better wear resistance than the polymeric binder component alone.

EXAMPLES 9, 10 AND 11

The following components were added in the order shown to prepare Examples 9, 10 and 11:

| | Amount (grams per 600 milliliter) | | |
|---|---|---|---|
| Material | Example 9 | Example 10 | Example 11 |
| Example 2 at 52.5 percent solids | 263.0 | 263.0 | 263.0 |
| DI Water | 14.9 | 9.8 | 18.0 |
| Ammonia @ 28 percent strength | 2.6 | 9.8 | 18.0 |
| poly-oxazolidinoethylmethacrylate @ 27.1 percent solids | 5.1 | 10.2 | 0.0 |
| Dispersant[1] | 3.5 | 3.5 | 3.5 |
| Surfactant[2] | 1.7 | 1.7 | 1.7 |
| Defoamer[3] | 1.3 | 1.3 | 1.3 |
| White Pigment[4] | 60.0 | 60.0 | 60.0 |
| Extender[5] | 456.4 | 456.4 | 456.4 |

Unless stated otherwise, the following commercial components were used:
[1]Tamol ® 901 Dispersant, an ammonium salt of polyelectrolyte supplied by Rohm and Haas Company, Philadelphia, Pennsylvania @ 30 percent by weight.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chemical Company, Boonton, New Jersey.
[4]Ti Pure ® R-900 Titanium dioxide supplied by E.I. duPont de Nemours & Company, Wilmington, Delaware,
[5]Omyacarb ® 5; Ground natural calcium carbonate, evaluated under ASTM D 1199, Type GC, Grade 11 having a number average particle size of 5.5 microns with maximum oil absorption No. of 10, supplied by Omya, Inc., Proctor, Vermont.

The components were mixed for 10 minutes or until smooth (the fineness of grind as tested according to ASTM D1210 of not less than 3 Hegman units) to form a mix to which the following components were added in the order shown with continuous mixing:

| | Amount (grams per 600 milliliter) | | |
|---|---|---|---|
| Material | Example 9 | Example 10 | Example 11 |
| Methanol | 18.0 | 18.0 | 18.0 |
| Coalescing solvent[6] | 13.8 | 13.8 | 13.8 |
| Defoamer[3] | 2.0 | 2.0 | 2.0 |

Unless stated otherwise, the following commercial components were used:
[6]Texanol ® Ester alcohol supplied by Eastman Chemicals, Kingsport, Tennessee.

Examples 9, 10 and 11, which formed the polymeric binder component, were mixed at the job site with 23 percent by weight based on the composition solids of the crosslinking component[7] of the coating composition.

The Evaluation of the Effect of Amine Level in the Blend and Emulsified Epoxy in the Crosslinking Component on No-Pick-Up Time and Storage Stability of the Pot Mix Examples 6, 9, 10 and 11 were applied to the test samples under the procedure described earlier. The effect of the storage stability on the viscosity of the layer applied over the test samples was also measured under the procedure described earlier. The results are tabulated below in Table 4:

TABLE 4

Storage Stability

| Example | % of Polyamine | % of Epoxy | No Pick-up Time in minutes | Initial viscosity in cp of pot mix | Viscosity after in cp of pot mix after 4 hours of pot life |
|---|---|---|---|---|---|
| 6 | 1.25 | 0 | 5 | 150 | 150 |
| 9 | 1 | 23 | 8 | 135 | 140 |
| 10 | 2 | 23 | 5 | 165 | 155 |
| 11 | 0 | 23 | 15 | 145 | 145 |
| Commercial Product[8] | | | 20 | more than 500 | gelled solid |

[8]Super Lifeline III, supplied by Linear Dynamics, Inc., Parsippany, New Jersey From Table 4, it can be seen that the addition of polyfunctional amine to the polymeric binder component greatly reduces the no-pick-up time of the traffic paint composition with and without the addition of the crosslinking component.

EXAMPLES 12 AND 13

To Examples 3, 4 and 5, the following components were added in the order shown below to prepare Examples 12 and 13:

| | Amount (grams) | |
|---|---|---|
| Material | Example 12 | Example 13 |
| Example 3 at 50 percent solids | 46.0 | — |
| Example 4 at 49.9 percent solids | — | 46.0 |
| Example 5 at 17.6 percent solids | 0.72 | 0.72 |
| Dispersant[1] | 3.5 | 3.5 |
| Surfactant[2] | 0.28 | 0.28 |
| Defoamer[3] | 0.20 | 0.20 |
| White Pigment[4] | 10.00 | 10.00 |
| Extender[5] | 76.06 | 76.06 |

Unless stated otherwise, the following commercial components were used:
[1]Tamol ® 901 Dispersant, an ammonium salt of polyelectrolyte supplied by Rohm and Haas Company, Philadelphia, Pennsylvania @ 30 percent by weight.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chemical Company, Boonton, New Jersey.
[4]Ti Pure ® R-900 Titanium dioxide supplied by E.I. duPont de Nemours & Company, Wilmington, Delaware.
[5]Omyacarb ® 5, Ground natural calcium carbonate, evaluated under ASTM D 1199, Type GC, Grade 11 having a number average particle size of 5.5 microns with maximum oil absorption No. of 10, supplied by Omya, Inc., Proctor, Vermont.

The components were mixed for 10 minutes or until smooth (the fineness of grind as tested according to ASTM D 1210 of not less than 3 Hegman units) to form a mix to which the following component were added in the order shown with continuous mixing:

| | Amount grams) | |
|---|---|---|
| Material | Example 12 | Example 13 |
| Methanol | 3.0 | 3.0 |
| Coalescing solvent[6] | 2.3 | 2.3 |
| DI Water | 1.16 | 1.16 |
| Defoamer[3] | 0.35 | 0.35 |

Unless stated otherwise, the following commercial components were used:

-continued

| | Amount grams) | |
|---|---|---|
| Material | Example 12 | Example 13 |

[6]Texanol ® Ester alcohol supplied by Eastman Chemicals, Kingsport, Tennessee.

EXAMPLES 14 THROUGH 19

To 20 grams of Examples 12 and 13, which formed the polymeric component, a crosslinking component (an epoxysilane supplied by United Chemical Technologies, Bristol, Pa. under the trademark G-6270) was added, in grams at 33.3% solution in water, in the quantities shown below to produce Examples 14 through 19*:

| | Ex. 14 | Ex. 15 | Ex. 16 | Ex. 17 | Ex. 18 | Ex. 19 |
|---|---|---|---|---|---|---|
| Ex. 12 | 20.00 | 20.00 | 20.00 | | | |
| Ex. 13 | | | | 20.00 | 20.00 | 20.00 |
| Epoxysilane | 0.05 | 0.10 | 0.20 | 0.05 | 0.10 | 0.20 |

Ex. means Example

*The amount of the epoxysilane added in Examples 14 through 19 was based on the following formula (Equation 1):

Amount of epoxysilane added in grams=amount of pigment added (gram)×specific surface area of the pigment (meters$^2$/gram)/minimum coverage area of the epoxysilane (meters$^2$/gram). The specific surface area for G-6270 epoxysilane was 330 meters$^2$/gram.

The adhesive scrub resistance of coatings from Examples 14 through 19, which were applied and then scrub resistance tested in accordance with the procedure provided in the abrasive resistance scrub test described earlier. The scrub resistance of these coatings was noted as the number of scrubs in Table 5 below:

TABLE 5

| Level of Epoxysilane Added* | Examples based on High Molecular Weight Binder Polymer** | Number of rubs | Examples based on Low Molecular Weight Binder Polymer*** | Number of rubs |
|---|---|---|---|---|
| 0% | Example 12 | 810 | Example 13 | 510 |
| 25% | Example 14 | 1000 | Example 17 | 450 |

TABLE 5-continued

| Level of Epoxysilane Added* | Examples based on High Molecular Weight Binder Polymer** | Number of rubs | Examples based on Low Molecular Weight Binder Polymer*** | Number of rubs |
|---|---|---|---|---|
| 50% | Example 15 | 1130 | Example 18 | 450 |
| 100% | Example 16 | 1700 | Example 19 | 710 |

*Expressed in percentages of epoxysilane required under Equation 1
**High molecular weight binder polymer means binder polymers having GPC weight average molecular weight of more than 100,000.
***Low molecular weight binder polymer means binder polymers having GPC weight average molecular weight of less than 100,000.

From Table 5, it is seen that as the level of epoxysilane added is raised, the scrub resistance of the coating resulting therefrom is improved, and as the molecular weight of the latex polymer used is increased, a significant improvement in scrub resistance is noted. Most significant improvement in scrub resistance was noted in Example 16, which utilized high molecular weight and higher amount of epoxysilane.

EXAMPLES 20 AND 21

To Examples 3 and 5, the following components were added in the order shown below to prepare Examples 20 and 21:

| Material | Amount (grams) | |
|---|---|---|
| | Example 20 | Example 21 |
| Example 3 at 50.0 percent solids | 46.0 | 45.6 |
| Example 5 at 17.6 percent solids | 1.63 | 1.4 |
| Dispersant[1] | 0.72 | 0.72 |
| Surfactant[2] | 0.28 | 0.28 |
| Defoamer[3] | 0.20 | 0.20 |
| White Pigment[4] | 10.00 | 10.00 |
| Extender[5] | 76.00 | 16.8 |

Unless stated otherwise, the following commercial components were used:
[1]Tamol ® 901 Dispersant, an ammonium salt of polyelectrolyte supplied by Rohm and Haas Company, Philadelphia, Pennsylvania @ 30 percent by weight.
[2]Surfynol ® CT-136 Surfactant, an acetylenic surfactant supplied by Air Products and Chemicals, Inc., Allentown, Pennsylvania.
[3]Drew ® L-493 Defoamer supplied by Drew Chamical Company, Boonton, New Jersey.
[4]Ti Pure ® R-900 Titanium dioxide supplied by E.I. duPont de Nemours & Company, Wilmington, Delaware.
[5]Omyacarb ® 5, Ground natural calcium carbonate, evaluated under ASTM D 1199, Type GC, Grade II having a number average particle size of 5.5 microns with maximum oil absorption No. of 10, supplied by Omya, Inc., Proctor, Vermont.

The components were mixed for 10 minutes or until smooth (the fineness of grind as tested according to ASTM D1210 of not less than 3 Hegman units) to form a mix to which the following component were added in the order shown with continuous mixing:

| Material | Amount (grams) | |
|---|---|---|
| | Example 20 | Example 21 |
| Solvent mix[6] | 6.46 | 6.46 |
| Defoamer[7] | 0.35 | 0.11 |
| Epoxysilane[8] | 7.4 | 2.84 |

Unless stated otherwise, the following commercial components were used:
[6]3.00 grams of methanol/1.16 grams of DI water and 2.30 grams of Texanol ® Ester alcohol supplied by Eastman Chemicals, Kingsport, Tennessee.
[7]Drew ® L-405 Defoamer supplied by Drew Chemical Company, Boonton, New Jersey.
[8]20 percent solution in water of G-6270 supplied by United Chemical Technologies, Bristol, Pennsylvania.

TABLE 6

| | Example 20 | Example 21 |
|---|---|---|
| Level of Epoxy silane added* | 100% | 150% |
| Nos. abrasive rubs | 1670 | 1810 |
| Initial viscosity (cps)** | 287.5 | 222.5 |
| Viscosity after 8 hours** | 345.0 | 307.5 |

*Expressed in percentages of epoxysilane required under Equation 1.
**Viscosities measaured with Brookfield viscometer, spindle #2 @ 60 rpm.

From Table 6, it is seen that as the level of epoxy silane added was increased, even more significant improvement in scrub resistance was obtained while still retaining acceptable shelf stability.

What is claimed is:

1. A coating composition with extended storage stability comprising:

a polymeric binder component and a crosslinking component, wherein said polymeric binder component comprises:

an anionically stabilized binder polymer having at least one reactive functional pendent moiety, or a blend of said binder polymer with in the range of from 0.01 to 20 weight percent based on the total weight of polymeric binder component solids of a polyfunctional amine; and wherein said composition with extended storage stability comprises said crosslinking component in a stoichiometric ratio varying in the range of from 0.05 to 10 of said crosslinking component in mole equivalents to total amount in mole equivalents of said reactive functional pendent moiety on said blend or said binder polymer.

2. The composition of claim 1 wherein said polyfunctional amine is polymerized from 20 weight percent to 100 weight percent based on the total weight of polymeric binder component solids of an amine monomer.

3. The composition of claim 1 wherein said binder polymer is polymerized from 20 weight percent to 100 weight percent based on the total weight of polymeric binder component solids of an amine monomer.

4. The composition of claim 2 or 3 wherein said amine monomer is selected from the group consisting of dimethylaminopropylmethacrylamide, dimethylaminoethylmethacrylamide, tributylaminoethylmethacrylamide, oxazolidinoethylmethacrylate, 3-aminopropylmethacrylate, 2-isopropenyl-2-oxazoline and dimethylaminoethylmethacrylate.

5. The composition of claim 1 wherein said reactive functional pendent moiety is an acid, a protonated or deprotonated amine functional pendent moiety or combination of said acid and said protonated or deprotonated amine functional pendent moieties.

6. A wear resistant traffic paint composition with extended storage stability comprising:

a polymeric binder component and a crosslinking component, wherein said polymeric binder component comprises:

a volatile base; and an anionically stabilized binder polymer having at least one reactive functional pendent moiety, or a blend of said binder polymer with in the range of from 0.01 to 20 weight percent based on the total weight of polymeric binder component solids of a deprotonated polyfunctional amine which has been deprotonated by said base; and wherein said binder polymer has an acid number in the range of from 0.8 to 30 and a Tg in the range of from 0° C. to 60° C.; and wherein said composition with extended storage stability comprises said crosslinking component in a stoichiometric ratio varying in the range of from 0.05 to 10 of said crosslinking component in mole equivalents to total amount in mole equivalents of said reactive functional pendent moiety on said blend or said binder polymer.

7. A method for producing a wear resistant coating on a substrate surface comprising:

mixing a polymeric binder component of an aqueous wear resistant coating composition with a crosslinking component of said coating composition to form a pot mix, said polymeric binder component comprising:

an anionically stabilized binder polymer having at least one reactive functional pendent moiety, or a blend of said binder polymer with in the range of from 0.01 to 20 weight percent based on the total weight of polymeric binder component solids of a polyfunctional amine; said pot mix being mixed in a stoichiometric ratio varying in the range of from 0.05 to 10 of said crosslinking component in mole equivalents to total amount in mole equivalents of said reactive functional pendent moiety on said blend or said amine modified binder polymer;

applying a layer of said pot mix on a substrate surface;

drying said layer; and curing said layer to form said wear resistant coating on a substrate surface.

8. The method of claim 7 wherein a storage stability of said pot mix is up to 30 hours from the mixing step.

9. The method of claim 7 further comprising dropping glass beads on said layer to make said coating reflective to light.

10. The method of claim 9 further comprising contacting said layer with a coagulant for reducing the no-pick-up dry time of said coating.

* * * * *